(12) United States Patent
Liu et al.

(10) Patent No.: US 11,686,903 B2
(45) Date of Patent: Jun. 27, 2023

(54) OPTICAL-ELECTRICAL CONNECTOR

(71) Applicants: Mei-Miao Liu, Taipei (TW); Kenichiro Nakamura, Kanagawa (JP)

(72) Inventors: Mei-Miao Liu, Taipei (TW); Kenichiro Nakamura, Kanagawa (JP)

(73) Assignees: ACSUPER TECHNOLOGIES INC., Myau-Li County (TW); FIBERON TECHNOLOGIES INC., Westborough, MA (US)

(*) Notice: Subject to any disclaimer, the term of this patent is extended or adjusted under 35 U.S.C. 154(b) by 104 days.

(21) Appl. No.: 17/206,148

(22) Filed: Mar. 19, 2021

(65) Prior Publication Data

US 2022/0155532 A1    May 19, 2022

Related U.S. Application Data

(60) Provisional application No. 63/113,195, filed on Nov. 13, 2020.

(51) Int. Cl.
| | |
|---|---|
| G02B 6/38 | (2006.01) |
| H01R 13/05 | (2006.01) |
| H01R 13/639 | (2006.01) |
| H01R 13/514 | (2006.01) |

(52) U.S. Cl.
CPC ......... *G02B 6/3825* (2013.01); *G02B 6/3831* (2013.01); *G02B 6/3879* (2013.01); *G02B 6/3893* (2013.01); *H01R 13/514* (2013.01); *H01R 13/639* (2013.01)

(58) Field of Classification Search
CPC .............................. G02B 6/38; H01R 13/514
USPC ........................................................... 385/77
See application file for complete search history.

(56) References Cited

U.S. PATENT DOCUMENTS

| | | | | |
|---|---|---|---|---|
| 10,061,090 | B2* | 8/2018 | Coenegracht | G02B 6/3825 |
| 2009/0211801 | A1* | 8/2009 | Edwards | H05K 9/0058 |
| | | | | 174/377 |
| 2014/0219616 | A1* | 8/2014 | Ishii | G02B 6/4292 |
| | | | | 385/92 |
| 2017/0212315 | A1* | 7/2017 | Kurashima | G02B 6/3887 |
| 2019/0281691 | A1* | 9/2019 | Matsui | G02B 6/4272 |

FOREIGN PATENT DOCUMENTS

AU        2014214983 A1 *  8/2015  .......... G02B 6/3817

* cited by examiner

*Primary Examiner* — Kaveh C Kianni

(57) ABSTRACT

The present invention provides an optical-electrical connector for inserting into an optical adapter, comprising an optical connector module, an electrical connector module, a base, and a sliding cover. The electrical connector module is slidably coupled to the optical connector module and is locked when inserting into the optical adapter. The base comprises a through hole and the electrical connector module is slidable connected to the through hole. The sliding cover is slidably coupled to the base, wherein after the electrical connector module is released from the optical adapter by sliding the sliding cover, the optical connector module is released from the optical adapter.

7 Claims, 12 Drawing Sheets

OPTICAL-ELECTRICAL CONNECTOR

CROSS-REFERENCE TO RELATED APPLICATION

This application claims the benefit under 35 U.S.C. § 119(e) to the U.S. provisional patent application having the Ser. No. 63/113,195 filed on Nov. 13, 2020, the entirety of which is incorporated herein by reference.

FIELD OF INVENTION

The present invention relates to a connector, in particular to an optical-electrical connector with transmitting optical signal and electrical signal.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100 G optical module communication is not enough, and the future will be expected to move towards the era of 400 G optical module communications. With the advancement of communication technology, data centers or computer rooms must use ultra-high-density wiring to meet the needs of use.

In order to meet the aforementioned use requirements, optical connectors with optical fiber conductive media have become the main reason for the increase in data volume and transmission rate of data centers. However, in certain usage scenarios, such as transmission towers or relay stations, in addition to using optical fiber to transmit information, wires for transmitting electric power are also needed to supply power to the receiver and transmitter. Based on this demand, there are optical-electrical connectors that can transmit optical signals and electric signal at the same time on the market.

Although the conventional technology has connectors that generate optical signals and electrical signal at the same time, due to the difference in the operation of optical signal and electrical signal, when the optical-electrical connector is inserted into the optical adapter or unplugged from the optical adapter, the timing at which the optical connector for transmitting optical signals and the electrical connector for transmitting electrical signals are coupled or electrically connected to the optical adapter is very important. If the outer housing of the conventional optical-electrical connector is loose, the part of the electrical connector module still conducts the electric signal, but the part of the optical connector module cannot conduct the optical signal due to the loss of axial force, which causes the problem that the power is not interrupted, but the connector that transmits the optical signal is interrupted. Therefore, an optical-electrical connector is needed to solve the problems caused by the conventional technology.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical-electrical connector that provides both optical and electrical signals. The module for transmitting the optical signal and the electrical signal respectively has a locking device, so that after the optical-electrical connector is inserted into the optical adapter, the optical connector module and the electrical connector module are locked with the optical adapter at the same time. Alternatively, the optical connector module is locked with the optical adapter firstly, and then the electrical connector module is locked with the optical adapter. In addition, through the two-stage unlocking mechanism of the optical-electrical connector, when the optical-electrical connector is unplugged accidentally in the drawing direction or the optical-electrical connector is unplugged from the optical adapter, the electrical connector module is unlocked firstly, and then optical connector module is unlocked to avoid the following situation, when the user pulls out the optical-electrical connector accidently, the optical connector module that transmits the optical signal is taken away from the optical adapter, resulting in the problem of signal disconnection. As long as the optical cable is not pulled out, the present invention can achieve the effect that the path for transmitting the optical signal is conductive.

In one embodiment, the present invention provides an optical-electrical connector, comprising: an optical connector module; an electrical connector module, slidably connected to the optical connector module and coupled to the optical adapter; a base, coupled to the optical connector module and having a sliding hole, and the electrical connector module slidably disposed into the sliding hole; and a sliding cover, slidably disposed on the base, wherein after the electrical connector module is released from the optical adapter by sliding the sliding cover, the optical connector module is released from the optical adapter.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1A:
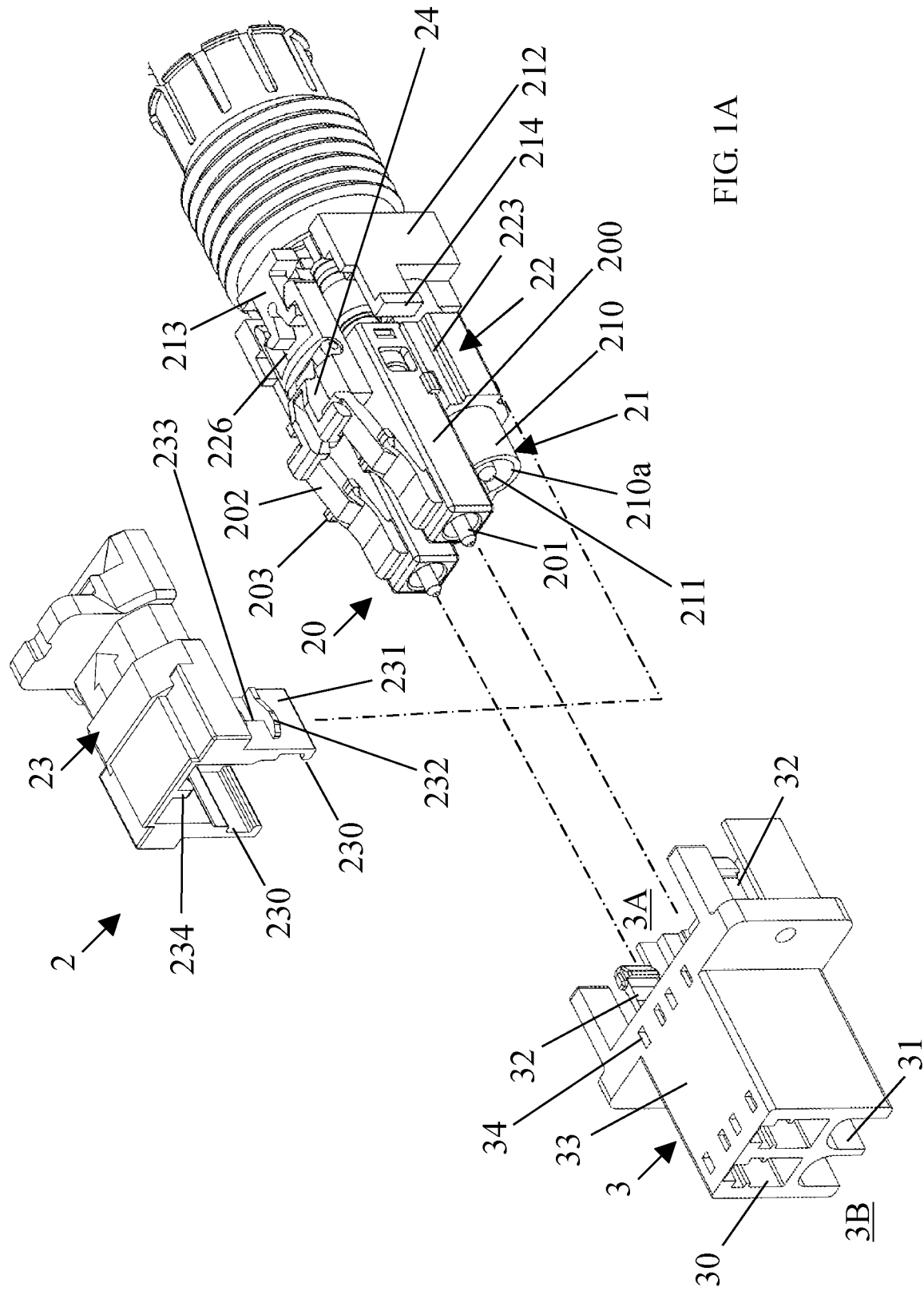
FIGS. 1A and 1B are respectively a three-dimensional exploded diagram of an embodiment of the optical-electrical module and the optical-electrical connector in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical-electrical connector to aid it of skilled in the art in practicing this invention. These embodiments are merely exemplary embodiments and in no way to be considered to limit the scope of the invention in any manner.

Figure 1B:
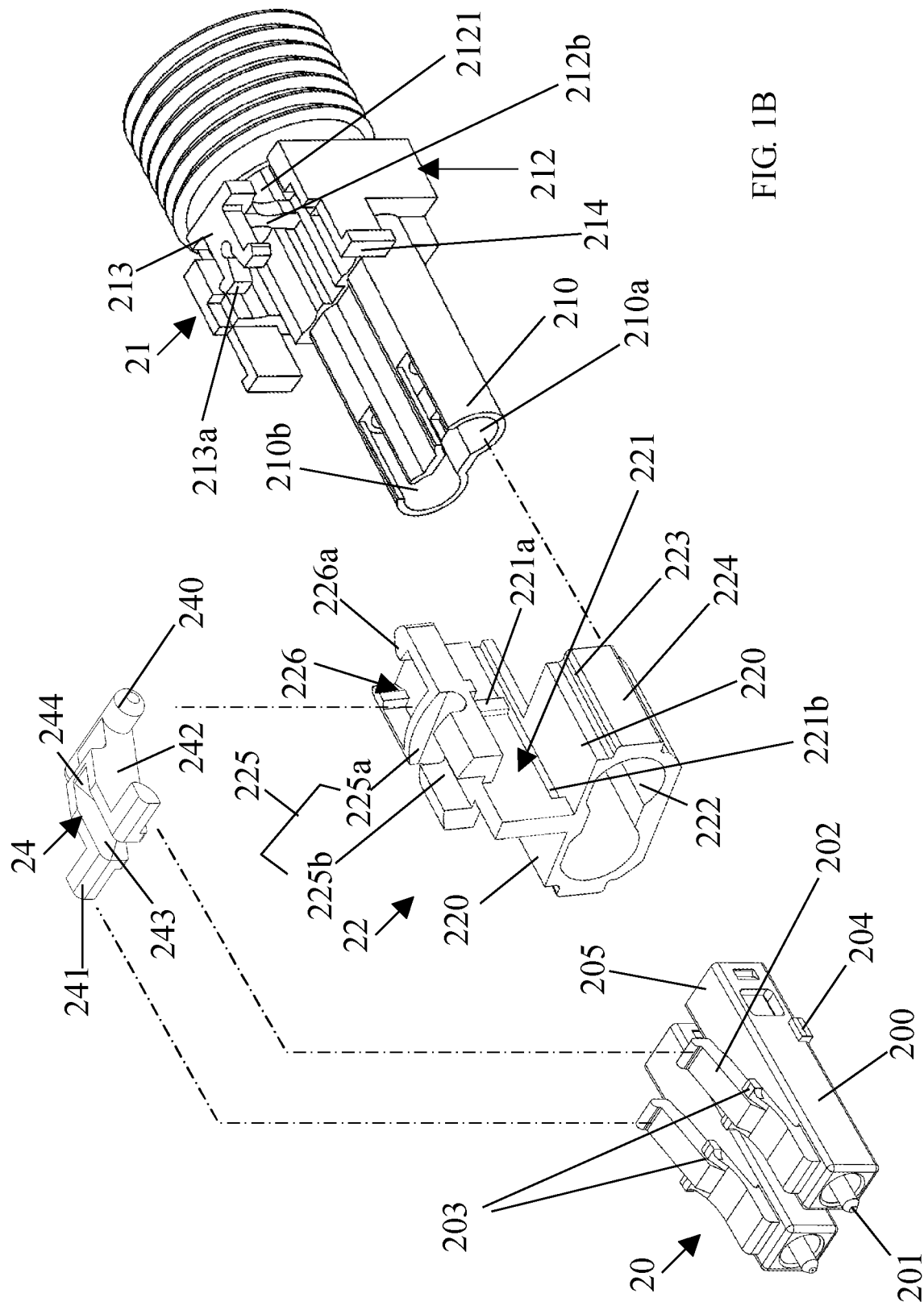

Please refer to FIGS. 1A and 1B, which are respectively a three-dimensional exploded diagram of an embodiment of the optical-electrical module and the optical-electrical connector in the present invention. In this embodiment, the optical-electrical module includes an optical adapter 3 and an optical-electrical connector 2 coupled to the optical adapter 3. The upper half of the optical adapter 3 has a first slot 30, the lower half of the optical adapter 3 has a second slot 31, and the optical-electrical connector 2 is inserted into the first slot 30 and the second slot 31. In this embodiment, the optical-electrical connector 2 is inserted into the optical adapter 3 from the first insertion side 3A of the optical adapter 3. The optical adapter 3 has a second buckle structure 32 on a lateral wall of the first insertion side 3A, and the top surface 33 of the optical adapter 3 has a plurality of locking structures 34. In this embodiment, the locking structure 34 is a through hole. The function of the second buckle structure 32 and the locking structure 34 would be described later.

The optical-electrical connector 2 includes an optical connector module 20, an electrical connector module 21, a base 22 and a sliding cover 23. The optical connector module 20 has a plurality of housings 200 arranged on the base 22. It should be noted that although in this embodiment, a plurality of housings 200 are taken as an example, the number of housings is not limited to more than two, and a single housing 200 may also be implemented. Each housing 200 corresponds to the first slot 30. The housing 200 has a coupling terminal 201, which is connected to the optical-electrical connector inserted from the second insertion side 3B (not shown) for transmission the light signal. There are buckle arms 202 on the upper surface of the housing 200, wherein each buckle arm 202 has a locking member 203 on both sides. When each housing 200 is inserted into the corresponding first slot 30, the locking members 203 on both sides of the buckle arm 202 are combined with the locking structure 34 to ensure that each housing 200 may be positioned into the first slot 30 of the optical adapter 3. In this embodiment, the locking structure 34 is a through-hole, and the locking member 203 is a bump that may be embedded into the through hole.

The base 22 has a loading surface 220 with a partitioning plate 221 thereon to divide the loading surface 220 into two areas, which respectively accommodate with the housing 200. The partitioning plate 221 further includes a limiting structure 221a and a limiting slot 221b. When the housing 200 is placed on the loading surface 220, the end portion 205 of the housing 200 is leaned against the limiting structure 221a, and the limiting slot 221b accommodates with the restraining member 204 on the housing 200, so that the housing 200 would be restrained in both directions of its axis. The base 22 further has a sliding hole 222 to allow the electrical connector module 21 to pass through. A guiding structure 223 is slidably connected to the sliding cover 23 on both sides of the base 22. In this embodiment, there are convex blocks 224 on both sides of the base 22, and the guiding structure 223 is formed on the upper side and lower side of the convex blocks 224. The top of the partitioning plate 221 has an accommodating groove 225 for accommodating with the releasing structure 24. In this embodiment, the accommodating groove 225 further includes a pivot groove 225a and a structural groove 225b, and the releasing structure 24 includes a structural body 242, a pivot 240, and a pressing rod 241, wherein the pivot 240 is connected to an end of the structural body 242, and the pressing rod 241 is connected to another end of the structural body 242. The pivot 240 is accommodated in the pivot groove 225a, and the structural body 242 is accommodated in the structural groove 225b. In this embodiment, the number of the pressing rod 241 is a pair, which corresponds to the buckle arm 202 respectively. The structural body 242 further has a groove 243, and there are pressing rods 241 on both sides of the groove 243. A leaning surface 244 is disposed in the groove 243. The operation way between the pressing rod 241 and the buckle arm 202 would be described later. There is a limiting groove 226 on one side of the accommodating groove 225, and limiting members 226a are disposed on both sides of the accommodating groove 225.

The electrical connector module 21 has a sliding housing 210 and a fixing base 212. The sliding housing 210 passes through the sliding hole 222 and is slidably connected to the sliding hole 222, and the fixing base 212 is connected to an end of the sliding housing 210. The sliding housing 210 may slide in the sliding hole 222. The sliding housing 210 has two accommodating spaces 210a and 210b, which may be communicated or not communicated with each other. The accommodating spaces 210a and 210b have conductive terminals 211. When the sliding housing 210 is inserted into the second slot 31 of the optical adapter 3 from the first insertion side 3A, the conductive terminal 211 and another electrical connector module (not shown) inserted into the second slot 31 from the second insertion side 3B are electrically connected to transmit power. The fixing base 212 has a through hole 2121 for allowing the optical fiber to pass through, and the passed optical fiber is then coupled to the optical connector module 20. The fixing base 212 has a supporting column 212b, one end of the supporting column 212b is connected to the fixing base 212 and another end of the supporting column 212b is connected to the leaning structure 213. In this embodiment, the leaning structure 213 is accommodated in the limiting groove 226, and the leaning structure 213 has a leaning member 213a. In this embodiment, the limiting member 226a and the leaning member 213a are hooks. When the sliding housing 210 slides to a predetermined position, the leaning member 213a is leaned against the limiting member 226a. In addition, both sides of the fixing base 212 have a first buckle structure 214, which is connected to the second buckle structure 32 when the electrical connector module 21 is coupled to the optical adapter 3.

The sliding cover 23 has guiding grooves 230 on both sides of the sliding cover 23 to be slidably connected with the guiding structure 223 respectively. The outer surface 231 of each guiding groove 230 has a unbuckle structure 232 and a pushing structure 233. The unbuckle structure 232 expands the second buckle structure 32 outwardly as the sliding cover 23 slides, so that the first buckle structure 214 is released from the second buckle structure 32. The pushing structure 233 is leaned against the first buckle structure 214 when the sliding cover 23 is slid to a predetermined position, so that the electrical connector module 21 may be pushed when the sliding cover 23 slides. In addition, the sliding cover 23 further has a protruding member 234, which pushes the leaning surface 244 in the groove 243 when the sliding cover 23 slides, thereby releasing the locking state between the optical connector module 20 and the optical adapter 3.

Figure 2A:
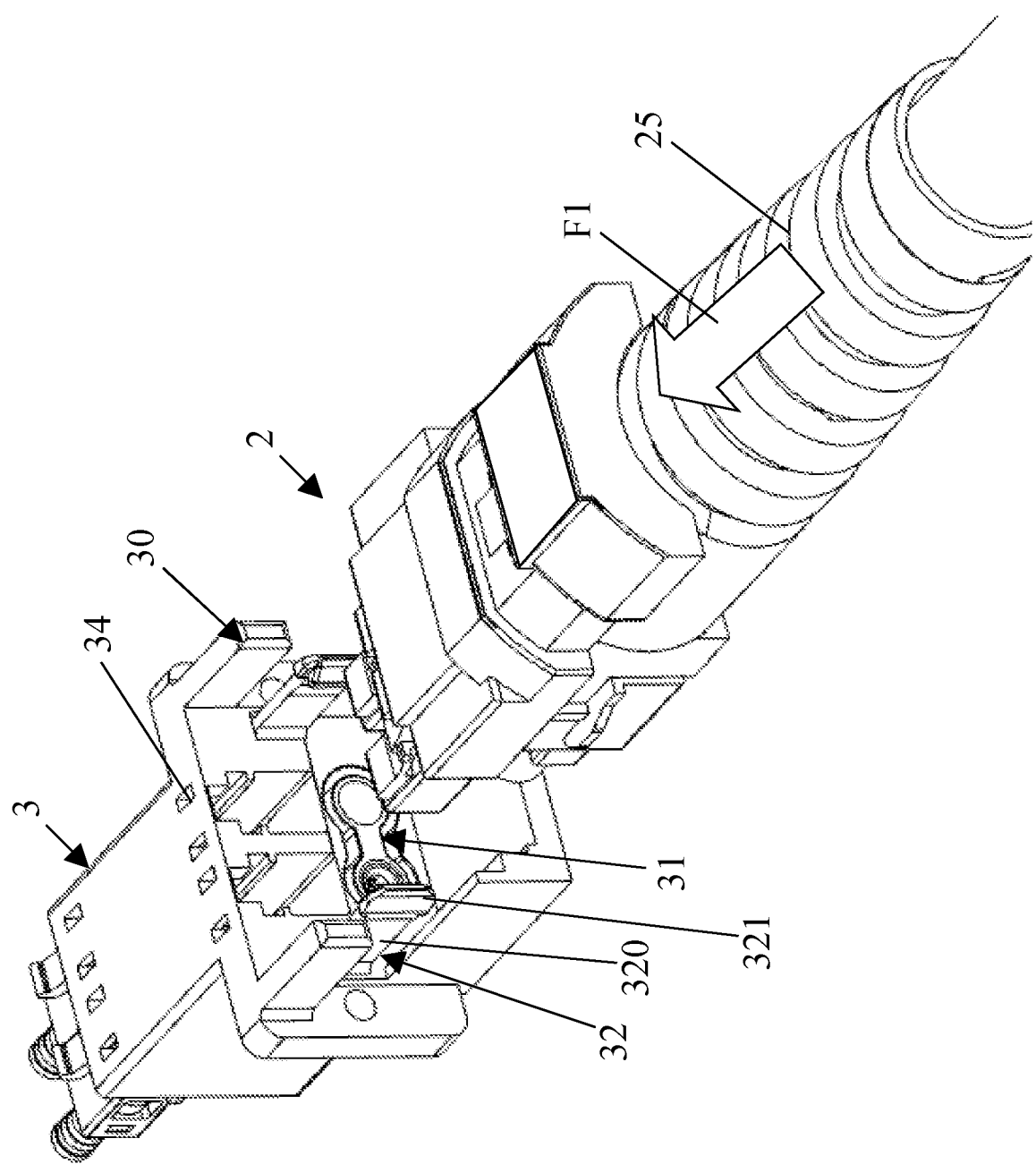
FIGS. 2A to 2F are respectively schematic diagrams of the embodiment inserting the optical-electrical connector into the optical adapter in the present invention.
Figure 2B:
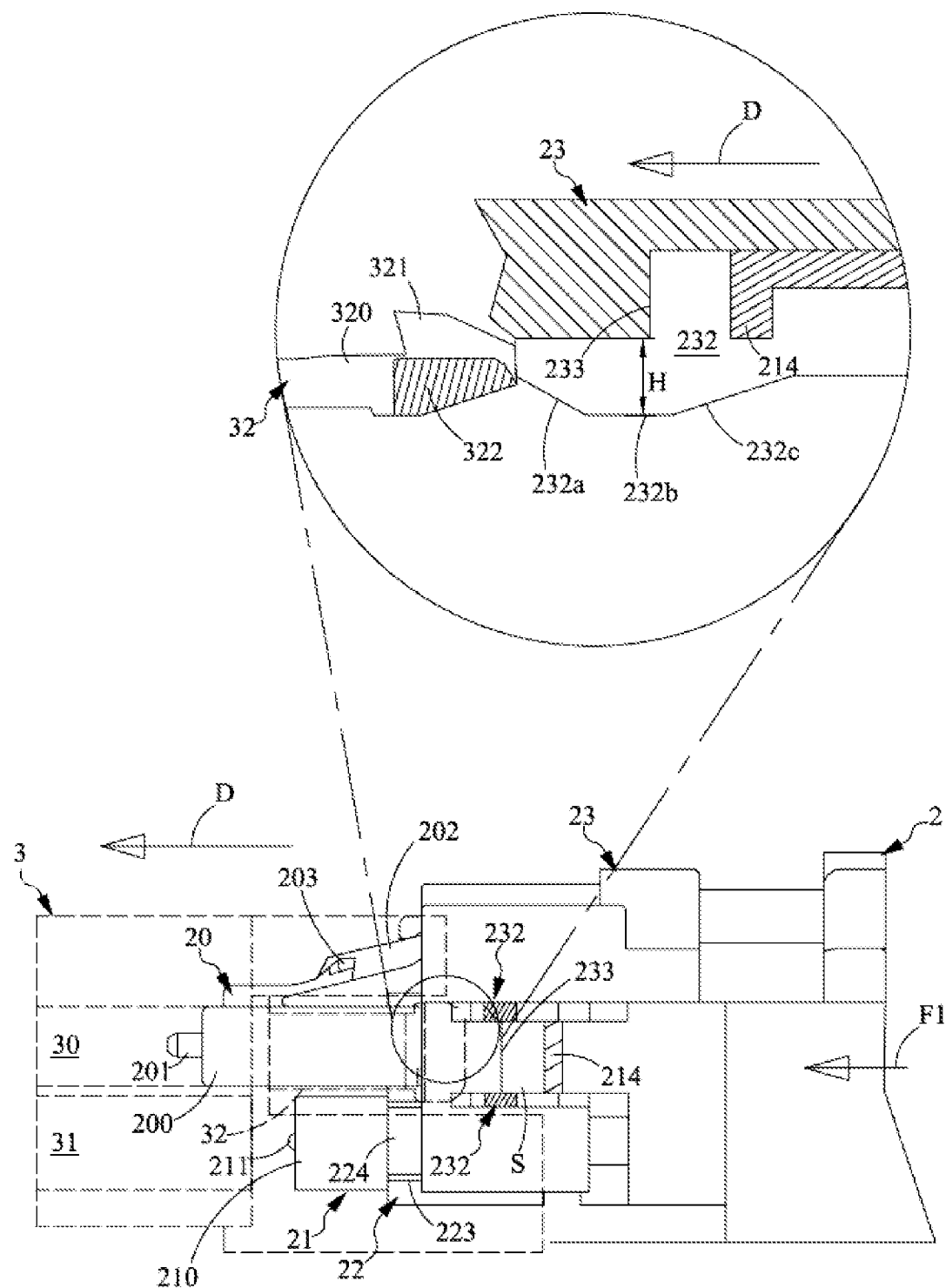

Next, the operation way of the optical-electrical connector shown in FIG. 1A and FIG. 1B would be explained. First, the operation of inserting the optical-electrical connector 2 into the optical adapter 3 would be described. As shown in FIG. 2A, the user grabs the boot structure 25 of the optical-electrical connector 2 and applies a pushing force F1 to insert it into the optical adapter 3. It should be noted that, when the optical-electrical connector 2 is inserted into the optical adapter 3, in one embodiment, the optical connector module 20 coupled to the optical adapter 3 is earlier than the electrical connector module 21 coupled to the optical adapter 3. Alternatively, in another embodiment, the optical connector module 20 and the electrical connector module 21 are coupled optical adapter 3 at the same time.

Figure 2C:
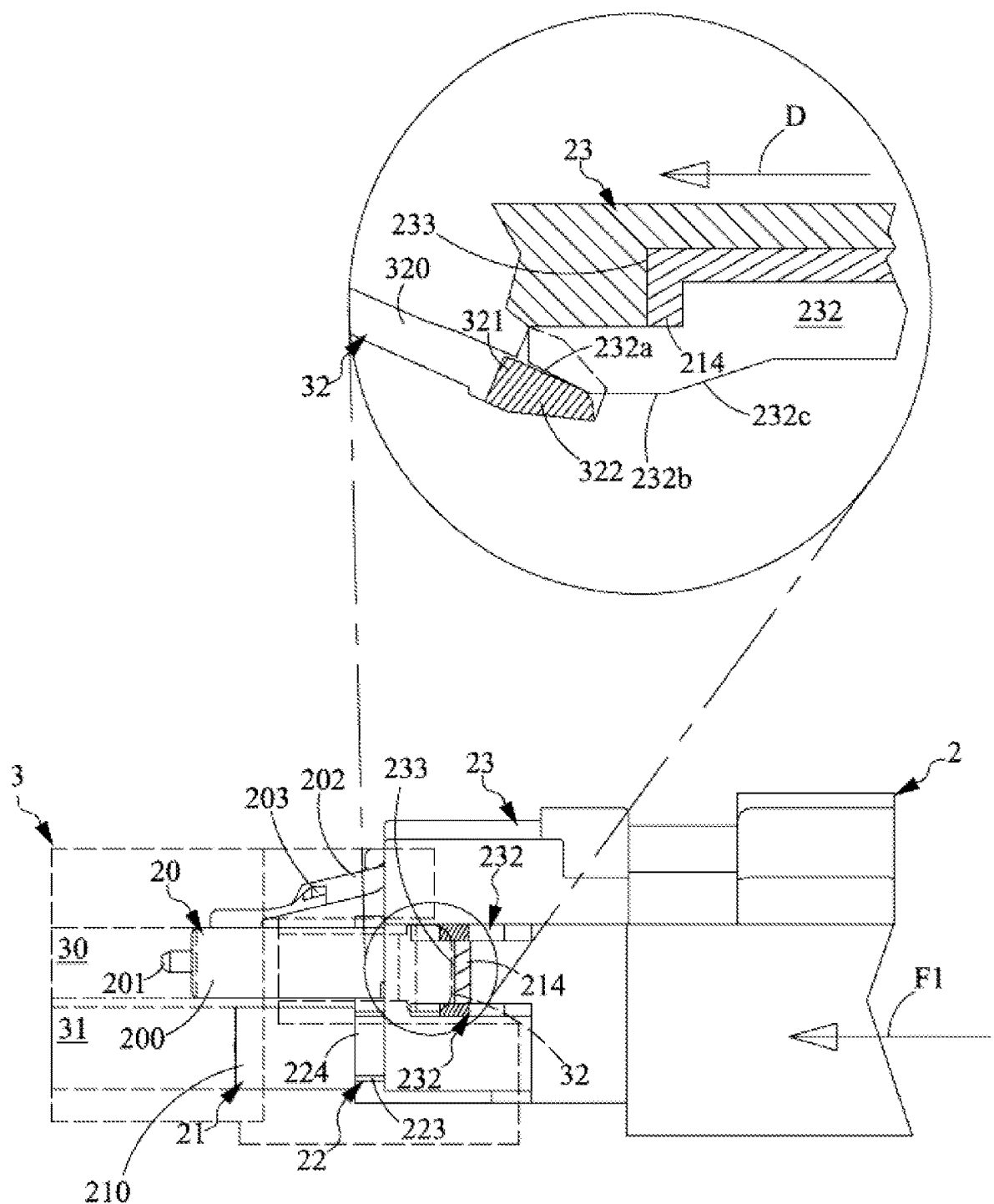

FIGS. 2B to 2E are side views of the optical-electrical connector 2 and the optical adapter 3, there is a sliding space S disposed between the first buckle structure 214 on the electrical connector module 21 of the optical-electrical connector 2 and the pushing structure 233 of the sliding cover 23. When the optical-electrical connector 2 is inserted into the optical adapter 3, the unbuckle structure 232 of the sliding cover 23 may contact the second buckle structure 32 of the optical adapter 3. In this embodiment, the unbuckle structure 232 protrudes from the lateral surface of the sliding cover 23, and has a first guiding inclined surface 232a, a convex surface 232b, and a second guiding inclined surface 232c, wherein the convex surface 232b is disposed between the first guiding inclined surface 232a and the second guiding inclined surface 232c, a height H protrudes from the lateral surface of the sliding cover 23. The second buckle structure 32 has a cantilever 320, a positioning hook 321, and a unbuckle body 322. The cantilever 320 extends outwardly from the optical adapter 3, the positioning hook 321 is disposed on an end of the cantilever 320, and the unbuckle body 322 protrudes from the two sides of the corresponding positioning hook 321. When the optical-electrical connector 2 continues to move to the optical adapter 3 from the state of FIG. 2A, it would become the state shown in FIG. 2B, and the first guiding inclined surface 232a is leaned against the unbuckle body 322 at this time. Since the electrical connector module 21 is slidably connected to the base 22, after the first guiding inclined surface 232a is leaned against the unbuckle body 322, as the pushing force F1 moves in the insertion direction D, the sliding space S is gradually shorten as the electrical connector module 21 continues to move in the insertion direction D, and eventually the first buckle structure 214 is leaned against the pushing structure 233 of the sliding cover 23, and the state as shown in FIG. 2C is formed. In the state of FIG. 2C, the pushing force F1 applied from the boot structure 25 pushes the optical-electrical connector 2, so that the optical connector module 20 and the electrical connector module 21 move together.

Figure 2D:
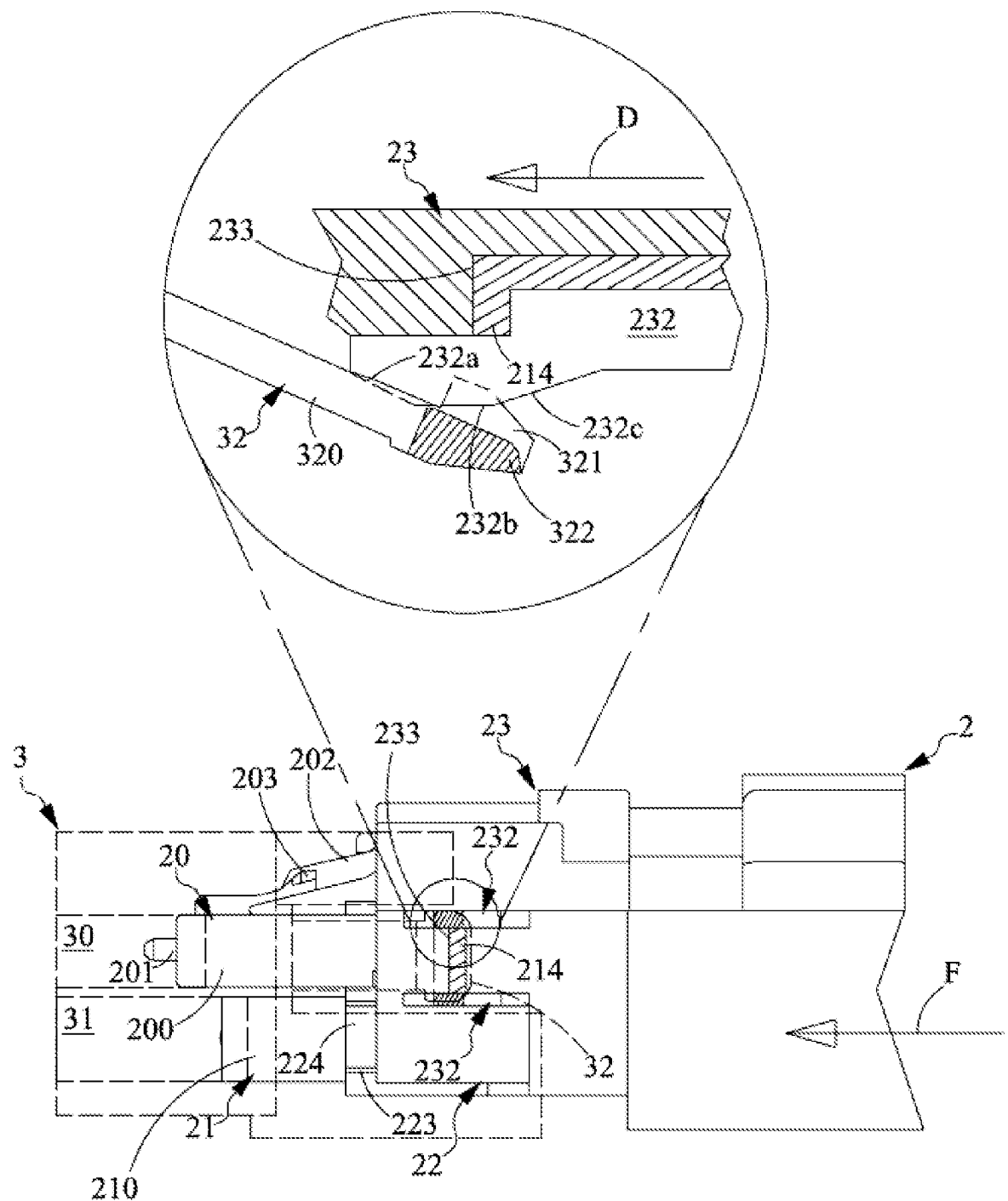
Figure 2E:
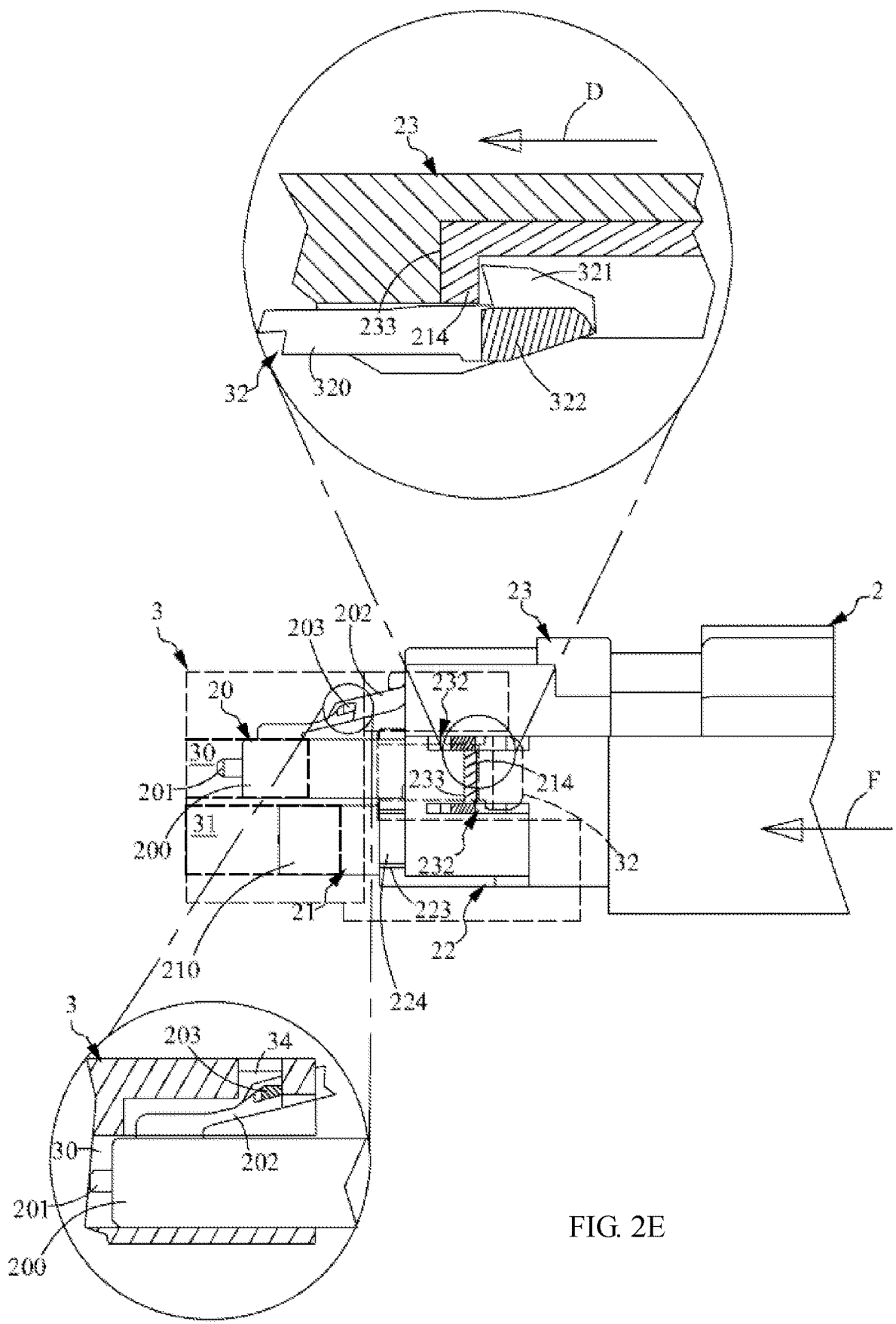
Figure 2F:
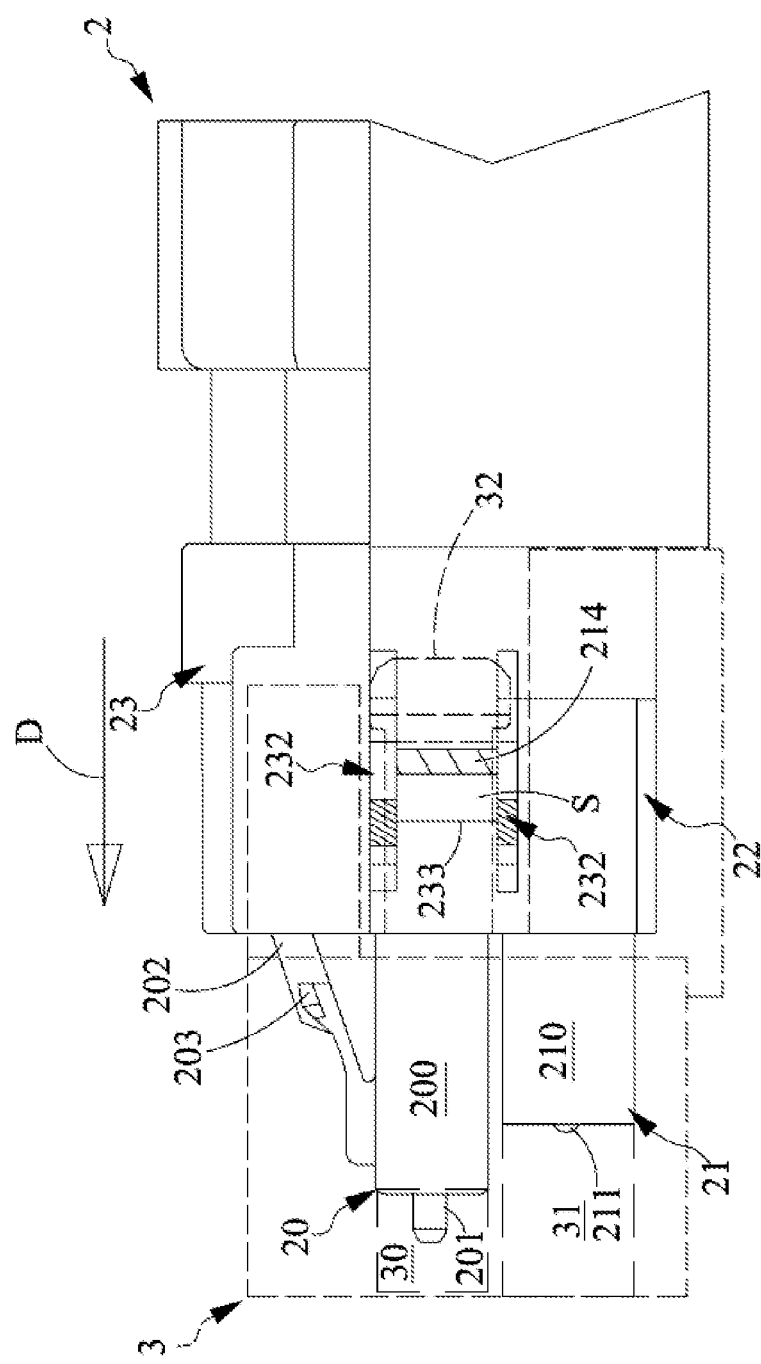

Next, the optical-electrical connector 2 continues to move in the insertion direction D. As the optical-electrical connector 2 moves, the first guiding inclined surface 232a pushes the unbuckle body 322 outwardly, driving the cantilever 320 to flexibly expand outwardly until the convex surface 232b contacts to the unbuckle body 322, and the state shown in FIG. 2D is formed. When the optical-electrical connector 2 continues to move in the insertion direction D, after the convex surface 232b passes through the unbuckle body 322, the height of the second guiding inclined surface 232c is dropped. When the electrical connector module 21 is inserted to the bottom and positioned, the second guiding inclined surface 232c passes through the unbuckle body 322. At this time, because the unbuckle body 322 is not pushed by any external force, it returns to the initial position by the cantilever 320, and the state as shown in FIG. 2E is formed. In the state of FIG. 2E, the positioning hook 321 has a restraining effect on the first buckle structure 214 of the electrical connector module 21. At the same time, the locking member 203 on the buckle arm 202 of the optical connector module 20 may also be embedded in the locking structure 34, so that the optical connector module 20 and the electrical connector module 21 are both locked. Next, as shown in FIG. 2F, the sliding cover 23 continues to move in the insertion direction D, so that a sliding space S is formed between the first buckle structure 214 and the pushing structure 233 of the sliding cover 23.

Figure 3A:
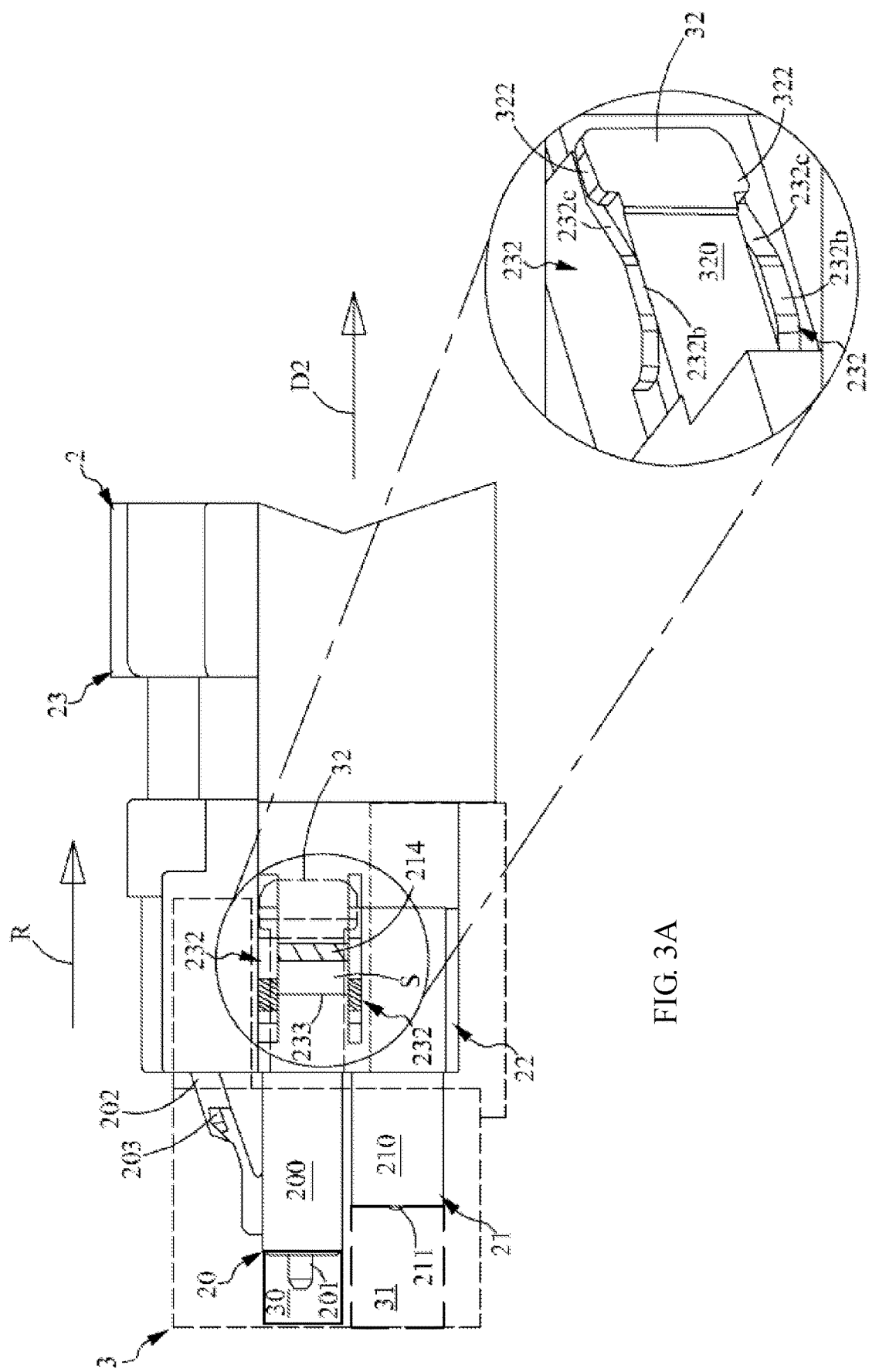
FIGS. 3A to 3D are respectively schematic diagrams of the embodiment unplugging the optical-electrical connector from the optical adapter in the present invention.
Figure 3B:
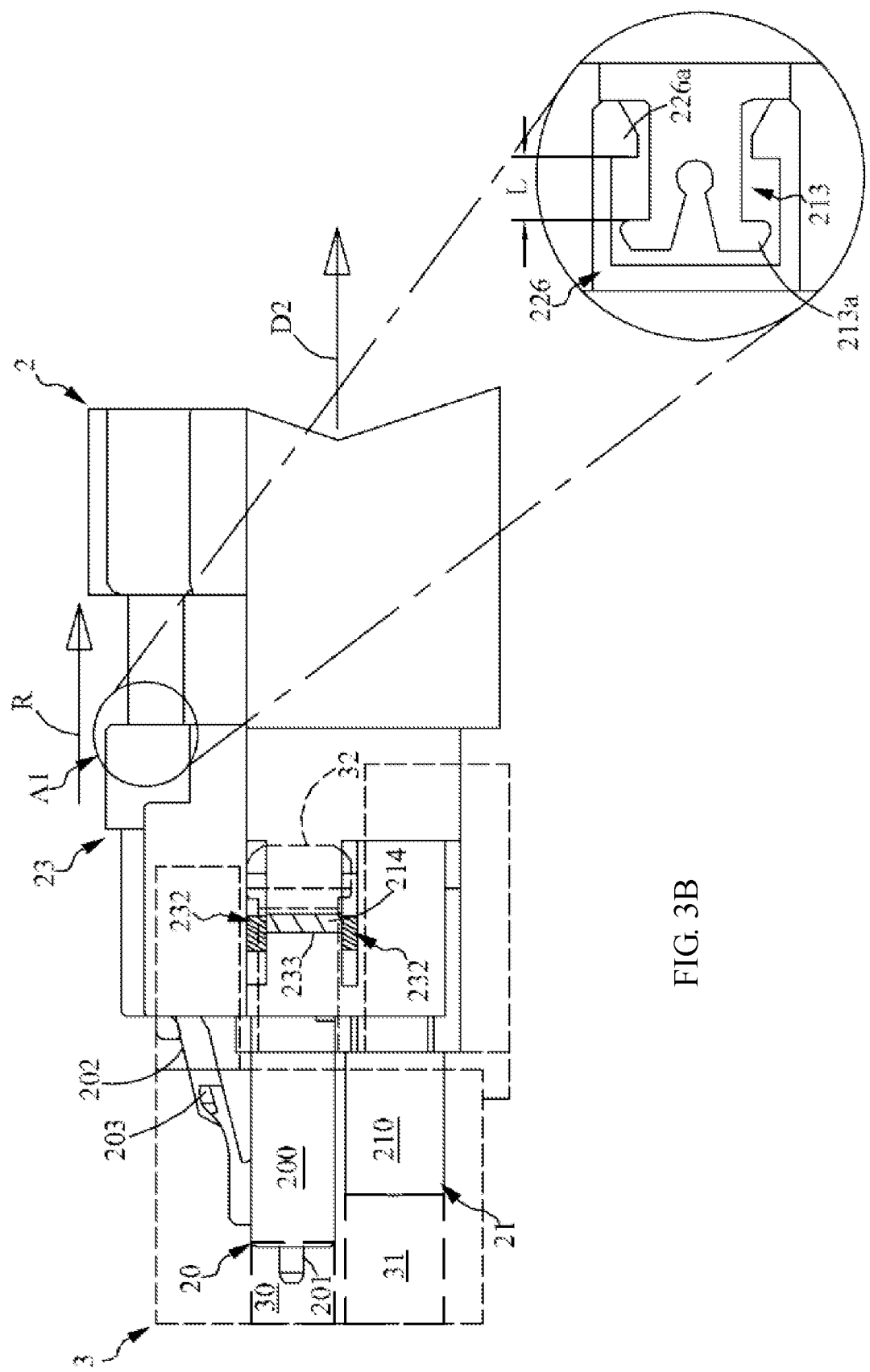

Next, the operation way of releasing the optical-electrical connector 2 from the optical adapter 3 would be explained. When the optical-electrical connector 2 is inserted into the optical-adapter 3, the optical connector module 20 and the electrical connector module 21 are locked at the same time. Therefore, if the optical-electrical connector 2 is to be removed from the optical adapter 3, the locking state needs to be released first. In this embodiment, when the optical-electrical connector 2 is pulled out from the optical adapter 3 by a pulling force R, the electrical connector module 21 slides and unlocks to separate from the optical adapter 3 earlier than the optical connector module 20 does. Then, the electrical connector module 21 drives the optical connector module 20 to unlock, thereby the optical-electrical connector 2 is released from the optical adapter 3. The detailed operation way would be described below. As shown in FIG. 3A, FIG. 3A illustrates the state where the optical-electrical connector 2 is inserted into the optical adapter 3. First, the user applies the pulling force R on the sliding cover 23 to make the sliding cover 23 move in the drawing direction D2. Next, referring to FIGS. 3A and 3B, in the state of FIG. 3A, a sliding space S is formed between the first buckle structure 214 and the pushing structure 233 of the sliding cover 23. When the sliding cover 23 moves in the drawing direction D2, the pushing structure 233 moves to the first buckle structure 214, so as to reduce the sliding space S, finally the pushing structure 233 is leaned against the first buckle structure 214, and the state as shown in FIG. 3B is formed. In this state, the optical connector module 20 and the electrical connector module 21 are still locked. The lower right area in FIG. 3B shows the positional relationship between the limiting groove 226 and the leaning structure 213 in the area A1 of the optical-electrical connector 2. In the state of FIG. 3B, the leaning member 213a of the leaning structure 213 and the limiting member 226a are separated by a predetermined distance L.

Figure 3C:
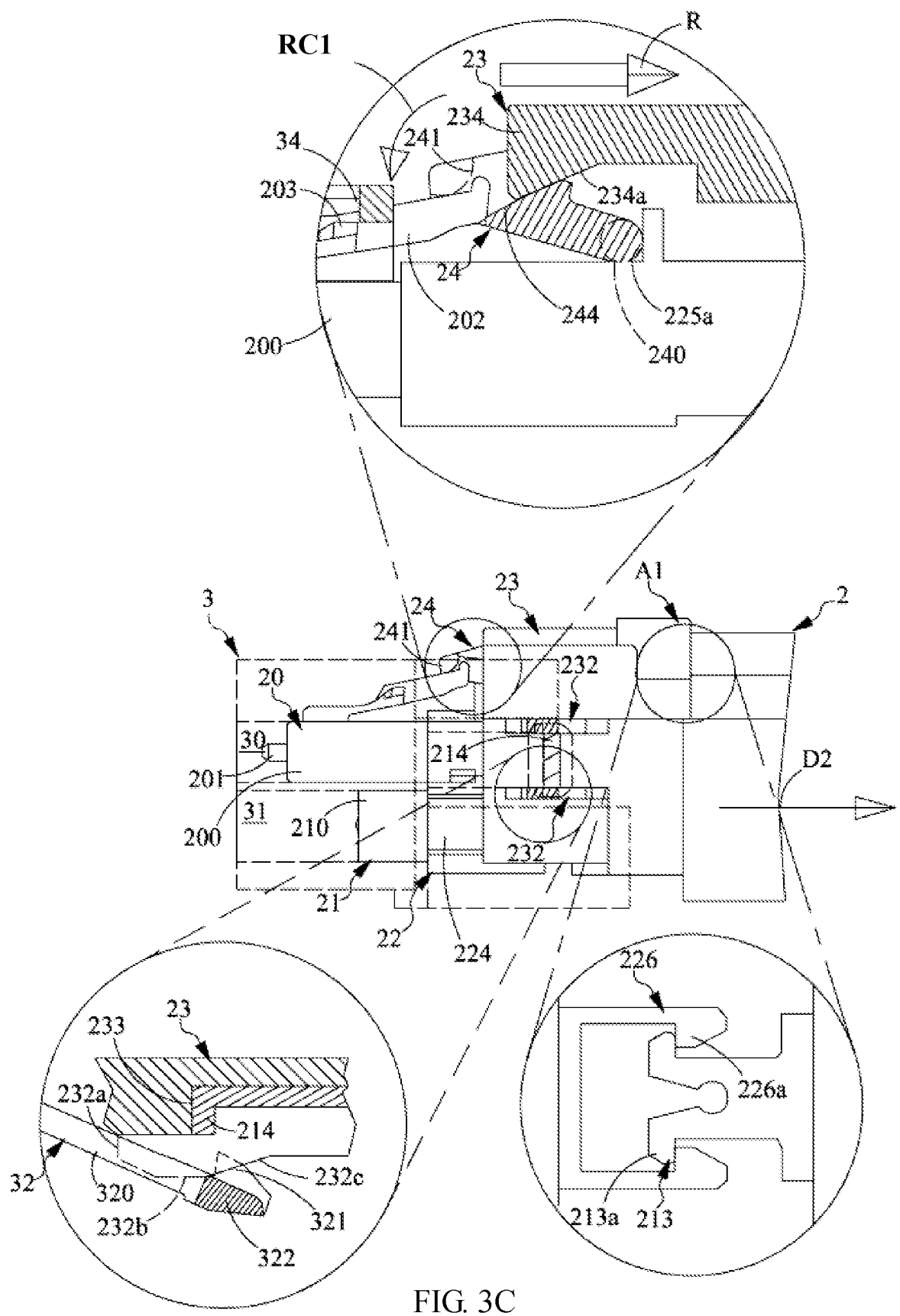

In the process from FIG. 3B to FIG. 3C, that is, while the sliding cover 23 continues to move in the drawing direction D2, as shown in the lower left area of FIG. 3C, the second guiding inclined surface 232c of the unbuckle structure 232 of the sliding cover 23 may contact to the unbuckle body 322, with the movement of the sliding cover 23, the second guiding inclined surface 232c pushes the unbuckle body 322 outwardly, releasing the buckling state of the positioning hook 321 and the first buckling structure 214. At this time, the first buckle structure 214 is no longer restrained by the positioning hook 321, and the locking state of the electrical connector module 21 and the optical adapter 3 is released. Therefore, as the pulling force R continues to be pulled in the drawing direction D2, the entire electrical connector module 21 starts to move in the drawing direction D2. Since the sliding housing 210 is slidably disposed into the base 22, when the pulling force R continues to pull the sliding cover 23 in the drawing direction D2, the sliding housing 210 moves in the drawing direction D2. During the movement of the sliding housing 210, as shown in area A1 of FIG. 3C, the leaning member 213a of the leaning structure 213 on the sliding housing 210 is finally leaned against the limiting member 226a of the limiting groove 226 on the base 22. After the leaning structure 213 is leaned against the limiting member 226a, the sliding cover 23 pushes the electrical connector module 21 and the electrical connector module 21 delivers the pushing force to the optical connector module 20, so that the optical connector module 20 and the electrical connector module 21 move simultaneously under the pulling force R.

Figure 3D:
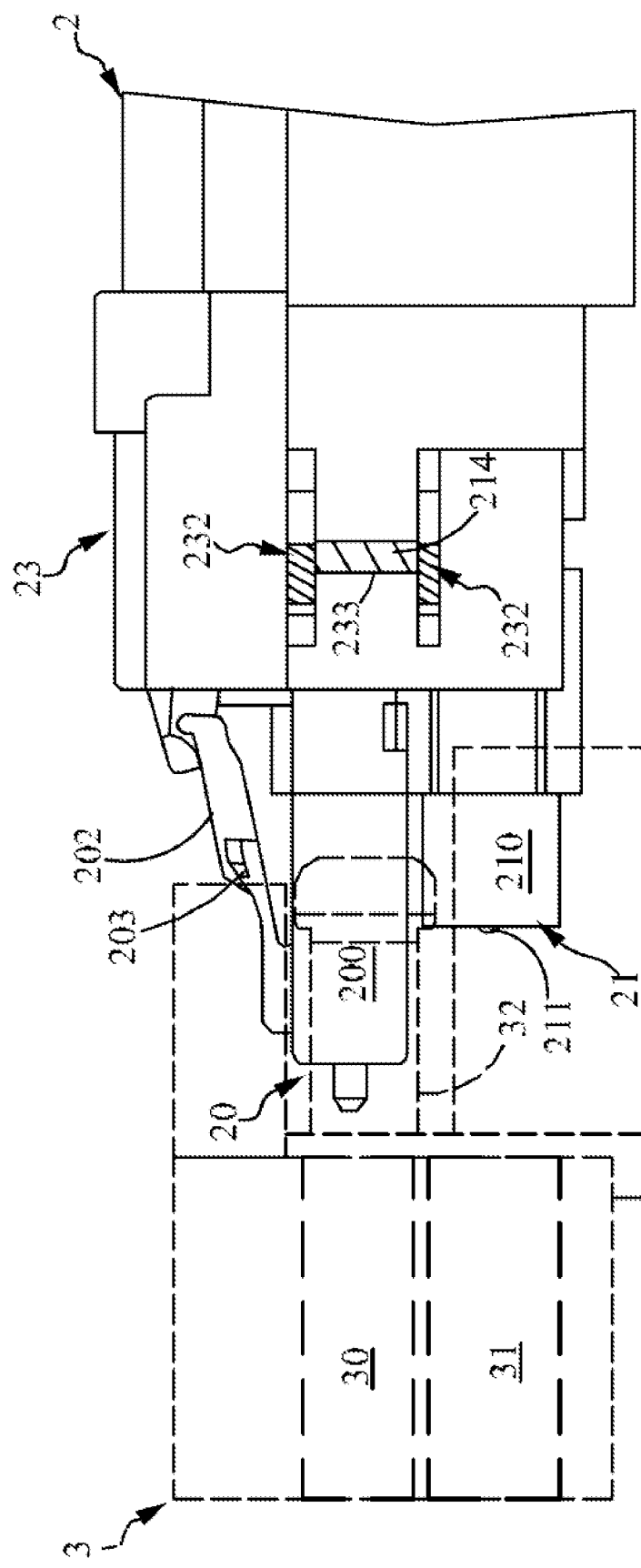

It should be noted that what is shown at the top of FIG. 3C is that the position inside the sliding cover 23 corresponding to the releasing structure 24 is a protruding member 234, which has a leaning surface 234a and corresponds to the leaning surface 244 of the releasing structure 24. In this embodiment, the leaning surfaces 234a and 244 are inclined surfaces. Therefore, when the sliding cover 23 is pulled in the drawing direction D2, at that time, the leaning structure 213 is leaned against the limiting member 226a, the leaning surface 234a slides to the position where the leaning surface 244 is in contact, and the leaning surface 234a presses the leaning surface 244 while the sliding cover 23 moves in the drawing direction D2. During the pressing process, the pivot 240 of the releasing structure 24 is supported by the pivot groove 225a and rotates in the counterclockwise direction RC1, so that the pressing rod 241 is pressed on the buckle arm 202. The buckle arm 202 pressed by the pressing rod 241 is rotated with the position, which is considered as the fulcrum and connected to the housing 200, so that the locking member 203 originally embedded in the locking structure 34 is released from the locking structure 34, thereby releasing the locking state of the optical connector module 20. In the state of FIG. 3C, the pulling force R continues to move in the drawing direction D2, and the optical connector module 20 and the electrical connector module 21 are moved in the drawing direction D2 at the same time. Finally, as shown in FIG. 3D, the entire optical-electrical connector 2 is released from the optical adapter 3.

In summary, the present invention provides an optical-electrical connector that provides both optical and electrical signals at the same time. The module for transmitting the optical signal and the electrical signal respectively has a locking device, so that after the optical-electrical connector is inserted into the optical adapter, the optical connector module and the electrical connector module are locked with the optical adapter at the same time. Alternatively, the optical connector module is locked with the optical adapter firstly, and then the electrical connector module is locked with the optical adapter. In addition, through the two-stage unlocking mechanism of the optical-electrical connector, when the optical-electrical connector is unplugged from the optical adapter, the electrical connector module is unlocked firstly, and then optical connector module is unlocked to avoid the following situation, when the user pulls out the optical-electrical connector accidently, the optical connector module that transmits the optical signal is taken away from the optical adapter, resulting in the problem of signal disconnection.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical-electrical connector for inserting into an optical adapter, comprising:
   an optical connector module;
   an electrical connector module, slidably connected to the optical connector module and coupled to the optical adapter;
   a base, installed between the electrical connector module and the optical connector module and having a sliding hole, and the electrical connector module slidably disposed into the sliding hole; and
   a sliding cover, slidably disposed on the base, wherein after the electrical connector module is released from the optical adapter by sliding the sliding cover, the optical connector module is released from the optical adapter.

2. The optical-electrical connector of claim 1, wherein when the optical-electrical connector is inserted into the optical adapter, the optical connector module is coupled to the optical adapter earlier than the electrical connector module, or the optical connector module and the electrical connector module are coupled to the optical adapter at the same time.

3. The optical-electrical connector of claim 1, wherein the base has an accommodating groove for accommodating a releasing structure, and the optical connector module has a housing with a buckle arm; when the optical connector module is inserted into the optical adapter, the buckle arm is buckled with the optical adapter, and the releasing structure is leaned against an end of the buckle arm; when the sliding cover is slid, a force is applied to the releasing structure so as to exert a pressure on the buckle arm, and the buckle arm is released from the optical adapter.

4. The optical-electrical connector of claim 1, wherein the base has a limiting member, the electrical connector module has a sliding housing with a leaning structure, the electrical connector module is moved by sliding the sliding cover, so that the leaning structure is leaned against the limiting member, and the leaning structure applies a force on the limiting member by a pulling force, thereby driving the optical connector module released from the optical adapter.

5. The optical-electrical connector of claim 4, wherein two sides of the sliding cover respectively have a guiding groove slidably disposed on two sides of the base, and two sides of the sliding housing have a first buckle structure for buckling with a second buckle structure on the optical adapter to position the electrical connector module, the first buckle structure is separated from the second buckle structure by sliding the sliding cover.

6. The optical-electrical connector of claim 5, wherein two sides of the sliding cover respectively have a unbuckle structure, which expands the second buckle structure outwardly as the sliding cover slides, so that the first buckle structure is released from the second buckle structure.

7. The optical-electrical connector of claim 1, wherein two sides of the base respectively have a guiding structure slidably connected to the sliding cover.

* * * * *